(12) United States Patent
DiStaulo

(10) Patent No.: US 7,070,154 B2
(45) Date of Patent: Jul. 4, 2006

(54) STORAGE BRACKET FOR A SNOW PLOW

(75) Inventor: Michael DiStaulo, Aurora, OH (US)

(73) Assignee: All-Type Welding and Fabrication, Inc., Glenwillow, OH (US)

(*) Notice: Subject to any disclaimer, the term of this patent is extended or adjusted under 35 U.S.C. 154(b) by 340 days.

(21) Appl. No.: 10/212,990

(22) Filed: Aug. 5, 2002

(65) Prior Publication Data
US 2004/0036242 A1 Feb. 26, 2004

(51) Int. Cl.
*F16M 11/00* (2006.01)

(52) U.S. Cl. ............ 248/200; 248/286.1; 37/231; 37/241; 403/306

(58) Field of Classification Search .......... 248/200, 248/313, 309.1, 314, 527, 525, 523, 201, 248/675, 285.1, 286.1; 403/172, 297, 306, 403/237; 37/231, 235, 241
See application file for complete search history.

(56) References Cited

U.S. PATENT DOCUMENTS

| | | | | |
|---|---|---|---|---|
| 2,117,095 A | * | 5/1938 | Alexander | 403/237 |
| 2,452,301 A | * | 10/1948 | Hester | 248/231.71 |
| 2,990,203 A | * | 6/1961 | Grover et al. | 403/174 |
| 3,520,508 A | * | 7/1970 | Tooley et al. | 249/18 |
| 3,659,363 A | * | 5/1972 | Snyder | 37/231 |
| 4,036,466 A | * | 7/1977 | Van Meter | 249/18 |
| 4,408,743 A | * | 10/1983 | DeWitt et al. | 248/285.1 |
| 4,514,940 A | * | 5/1985 | Manderla | 52/126.1 |
| 4,934,643 A | * | 6/1990 | Militano, Jr. | 248/124.2 |
| 5,228,737 A | * | 7/1993 | Zimmerman | 296/76 |
| 5,431,364 A | * | 7/1995 | Etter | 248/514 |
| 5,481,817 A | * | 1/1996 | Parker | 248/286.1 |

* cited by examiner

*Primary Examiner*—Korie Chan
(74) *Attorney, Agent, or Firm*—Pearne & Gordon LLP

(57) ABSTRACT

A storage bracket facilitates storage of portions of a vehicle snow plow. The snow plow has a support frame portion mountable to a vehicle, and a lift frame portion, mountable on the support frame portion, for lifting another portion of the snow plow. The support frame portion and the lift fame portion have inter-engagement segments that inter-engage when the lift frame is mounted on the support frame segment. The storage bracket includes a first segment for engaging the inter-engagement segment of the support frame portion when the support frame portion is removed from the associated vehicle. The storage bracket also includes a second segment for engaging the inter-engagement segment of the lift frame portion when the lift frame portion is removed from the associated vehicle. The storage bracket retains the lift frame portion relative to the support frame portion.

9 Claims, 4 Drawing Sheets

STORAGE BRACKET FOR A SNOW PLOW

TECHNICAL FIELD

The present invention relates to a vehicle-mountable snow plow, and specifically relates to a device for storage of snow plow components.

BACKGROUND OF THE INVENTION

A snow plow is a common add-on accessory item for a vehicle such as a truck. The add-on snow plow allows the vehicle to have a further function as a means to remove snow from a driveway, a parking lot, or the like. An add-on snow plow is especially popular for a light duty vehicle. The combination of a light duty vehicle with an add-on snow plow provides an arrangement for the expedient removal of snow in areas, such as driveways, that may be impractical to utilize a larger, over-the-road snow plow and truck arrangement. As such, add on snow plows are very popular. This is especially true in tempered regions where snow fall is seasonal and some what moderate.

Within such temperate zones, the snow plow is only useful for a portion of each year. During other portions, the snow plow serves no function on the associated vehicle and can be unnecessarily cumbersome. Further, at least one snow plow manufacturer recommends removing all or part of the snow plow from the vehicle when the snow plow is not in use.

A typical snow plow comprises several portions. These portions are inter-engaged when the snow plow is mounted for use on the associated vehicle. When these portions of the snow plow are removed from the vehicle, these portions do not regularly inter-engage with each other in a fashion that facilitates safe and compact storage.

SUMMARY OF THE INVENTION

In accordance with one aspect, the present invention provides a storage bracket for facilitating storage of portions of a vehicle snow plow arrangement when the portions are removed from the associated vehicle. The snow plow arrangement has a support frame portion mountable to the vehicle for supporting another portion of the snow plow arrangement. The snow plow arrangement has a lift frame portion mountable on the support frame portion, and the lift frame portion is for lifting another portion of snow plow arrangement. The support frame portion and the lift fame portion have inter-engagement segments that inter-engage when the lift frame is mounted on the support frame segment. The storage bracket includes a first segment for engaging the inter-engagement segment of the support frame portion of the snow plow arrangement when the support frame portion is removed from the associated vehicle. The storage bracket also includes a second segment for engaging the inter-engagement segment of the lift frame portion of the snow plow arrangement when the lift frame portion is removed from the associated vehicle. The storage bracket retains the lift frame portion relative to the support frame portion.

BRIEF DESCRIPTION OF THE DRAWINGS

The foregoing and other features and advantages of the present invention will become apparent to the person of ordinary skill in the art upon reading the description and review of the accompanying drawings, in which.

DESCRIPTION OF EXAMPLE EMBODIMENT

Figure 1:
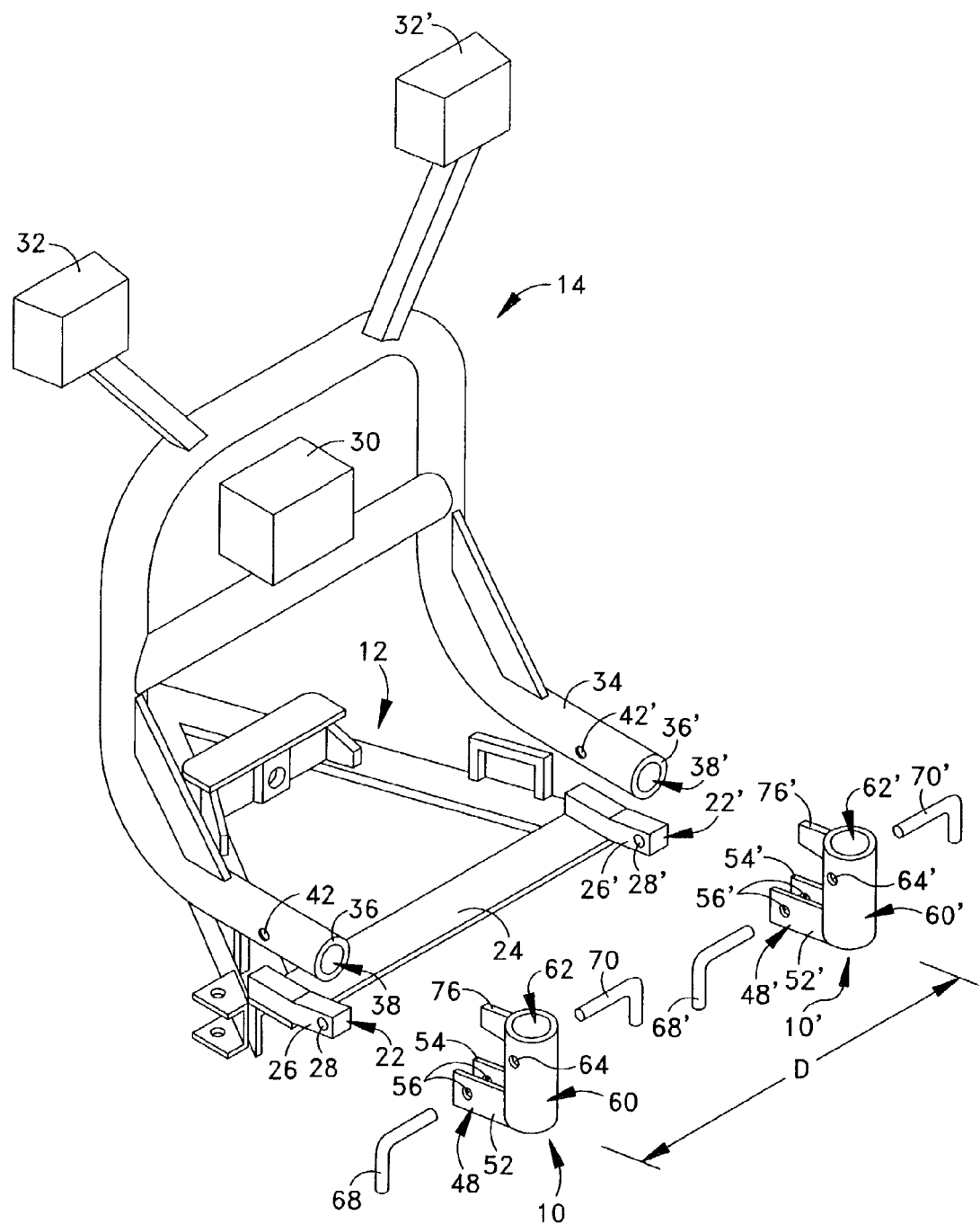
FIG. 1 is a simplified perspective view of two vehicle-detached snow plow arrangement portions and two storage brackets, in accordance with the present invention, for interconnecting the snow plow arrangement portions.
Figure 2:
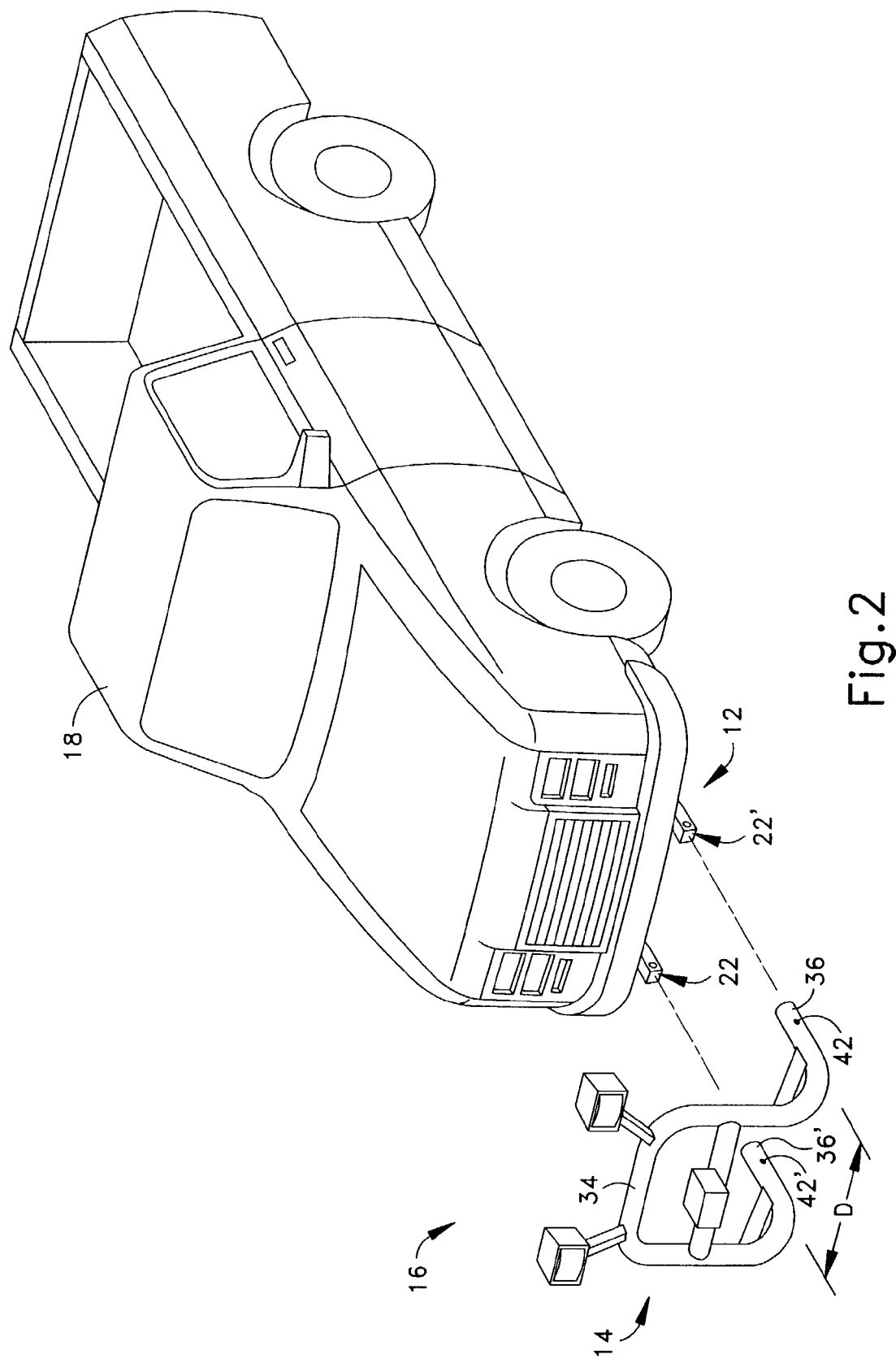
FIG. 2 is a simplified perspective view of a vehicle showing detachment of one of the snow plow arrangement portions of FIG. 1, with the other snow plow arrangement portion still attached to the vehicle.

Two storage brackets 10, 10', in accordance with the present invention, are shown in FIG. 1 along with two associated portions 12, 14 of a snow plow arrangement 16 (see FIG. 2). The snow plow arrangement 16 is associated with a vehicle 18, such as a pick-up truck. It is to be appreciated that a snow plow blade, which engages snow to be plowed, is a portion of the snow plow arrangement. Such a snow plow blade is not shown in FIG. 2 to provide for ease of illustration of other portions of the snow plow arrangement that are more relevant to the present invention.

The illustrated portions 12, 14 of the snow plow arrangement 16 include a support frame (also referred to as an A-frame) portion 12 that mounts under a front portion of the associated vehicle 18. The support frame portion 12 includes suitable structure for attachment to the vehicle 18 as will be appreciated by the person of ordinary skill in the art. The attachment structure is not discussed herein in detail.

In pertinent part, the support frame portion 12 includes two lift frame mounts 22, 22'. Each lift frame mount 22, 22' is located on an opposed end of a cross member 24 of the support frame portion 12. The lift frame mounts 22, 22' are spaced a distance "D" apart. The two lift frame mounts 22, 22' have certain identical structural features. As such, the identical features are discussed generically for both of the lift frame mounts 22, 22'. It is to be understood that the identical structure features are indicated by identical reference numerals, but with the "'" mark.

Each lift frame mount (e.g., 22) includes a projection (e.g., 26) that extends from the support frame portion 12 in a forward direction when the support frame portion is attached to the associated vehicle 18. Also, each lift frame mount (e.g., 22) includes a hole (e.g., 28) extending through the projection (e.g., 26). In the illustrated example, the projection (e.g., 26) is rectangular in cross section, and the hole (e.g., 28) has a circular cross-section and extends horizontally (i.e., parallel to the left to right direction). However, it is to be appreciated that different shapes, configurations, etc. of the lift frame mounts 22, 22' are possible. Also, it is to be appreciated that the support frame portion 12 generally is symmetric about a left-right dividing line.

The support frame portion 12 includes structure that interacts with structure (not shown) of the snow plow arrangement associated with the plow blade. Such interacting structure has been highly schematized or omitted for brevity.

The other illustrated portion 14 of the snow plow arrangement 16 is a lift frame portion 14. The lift frame portion 14 has a segment that extends upwardly, in front of the vehicle 18. A lifting connector (e.g., a chain, not shown) extends from the plow blade portion of the arrangement 16 to a lifting motor 30 (schematically shown) mounted on the lift frame portion 14. Operation of the lifting motor 30 causes height adjustment of the plow blade, as will be appreciated by the person of ordinary skill in the art.

Other components of the snow plow arrangement 16 are located on the lift frame 14. For example, light assemblies 32, 32' are attached to the lift frame. The structures (i.e., the motor 30, the light assemblies 32, 32', etc.) located on the lift frame 14 are somewhat more delicate than other portions of the snow plow arrangement 16. For example, each light assembly (e.g., 32) may include a glass lens. As such, it is to be appreciated that use, removal, and, notably, storage of the snow plow arrangement 16 should be accomplished in a manner that avoids damage.

The lift frame portion 14 is primarily composed of a member 34 that has several bends, and which has two ends 36, 36' that are spaced the distance "D" apart and that mate with the lift frame mounts 22', 22 of the support frame portion 12. Other structure of the lift frame portion 14 includes a cross-member and reinforcements. Such other structure, is not discussed further in detail.

Turning attention to the member 34, in the illustrated example, the member 34 is tube-shaped (e.g., circular cross-section). Starting from one end 36 (the left end as shown in FIG. 1), the member 34 has an opening 38 to an interior bore of the member. When the snow plow arrangement 16 is attached to the vehicle 18 (FIG. 2) the corresponding lift frame mount 22' extends into the opening 38. The member 34 extends forward (relative to the vehicle 18) from the end 36. At a distance in front of the vehicle 18, the member 34 is bent to turn upward. At a distance from the first bend, the member 34 is bent again to turn parallel to the ground and traverse along a segment of the front of the vehicle 18. At the end of the segment that extends along the front of the vehicle, the member 34 is bent downward. Subsequently, the member 34 is bent reward, with reference to the vehicle 18. The member 34 terminates at a second end 36' (see FIG. 1), which has an opening 38'. When the snow plow arrangement 16 is attached to the vehicle 18 (FIG. 2) the corresponding lift frame mount 22 extends into the opening 38'. As such, the member 34, and the lift frame portion 14 generally, is symmetric about a left-right dividing line. It is to be appreciated that other shapes and configurations are possible.

With the support frame portion 12 secured to the vehicle 18, the ends 36, 36' of the member 34 inter-engage with the lift frame mounts 22', 22, respectively. In the illustrated example, the projections 26, 26' of the lift frame mounts 22', 22 extend into the openings 38, 38' of the member 34. As such, the lift frame mounts 22', 22 of the support frame portion 12 and the member 34 of the lift frame portion 14 are inter-engaging portions. It is to be appreciated that different inter-engaging portions, having different structure, etc. may be provided dependent upon the design of the snow plow arrangement 16.

Holes 42, 42' extend transversely through both sides of the member 34 a distance from the respective ends 38, 38'. The location of the holes 42, 42' on the member 34 are such that with the projections 26', 26 extending to a desired distance into the member at the openings 38', 38, respectively, the holes 42, 42' are aligned with the holes 28', 28, respectively. Securing members (e.g., locking pins or bolts, not shown) extend through the aligned holes 28, 28', 42, 42' to secure the lift frame portion 14 onto the support frame portion 12. Such securing affixes the lift frame portion 14 in the mounted position on the support frame portion 12.

The left-right symmetry of the support frame portion 12 and the left-right symmetry of the lift frame portion 14 allows the lift frame portion to be rotated 180° relative to the mounting position of the lift frame portion on the support frame portion, with the lift frame mounts 22, 22' being adjacent to the ends 36, 36' (e.g., the distance "D" is constant). As such, upon removal of the support frame portion 12 and the lift frame portion 14, the lift frame portion is rotated 180° relative to the support frame, while still maintaining a distance relationship for the lift frame mounts 22, 22' to the ends 38, 38'.

It is to be appreciated that the specifics of the snow plow arrangement 16 are not to be considered as limitations on the present invention. The structure of the snow plow arrangement 16 is forth so that the structure and use of the storage brackets 10,10', in accordance within the present invention, may be easily understood. As such, it is to be appreciated that the snow plow arrangement 16 may be a MEYERS EZ MOUNT® snow plow arrangement.

Turning to the storage brackets 10, 10' of the present invention, in one example the brackets are structurally identical. As such, only the structure of the bracket 10 is discussed with the understanding that the other bracket 10' has the same structure (as indicated by the identical reference numerals with the "'" mark). In one example, the bracket 10 is made of metal. The bracket 10 has a generally "U" channel portion 48. Specifically, the channel portion 48 includes a lower plate 50 (see FIG. 4), a first side plate 52 (FIG. 1) located on one side of the lower plate and extending upward from the lower plate, and a second side plate 54 located on another side of the lower plate and extending upward from the lower plate. The upper side of the channel portion 48 is open, and as such, the channel portion defines a channel. It is to be noted that in the disclosed example, the channel has a shape and has dimensions that correspond to the shape and dimensions of the lift frame mount 22 such that the lift frame mount fits into the channel without undue tightness or undue excessive space.

One end of the channel is open. Adjacent to the open end of the channel, a hole 56 extends through each of the first and second side plates 52 and 54. The holes 56 are aligned with each other. The holes 56 are located such that when the lift frame mount 22 is placed in the channel, the holes 56 on the side plates 52, 54 are aligned with the hole 28 in the lift frame mount 22.

At the other end of the channel, the channel portion 48 is affixed (e.g., via welding) to a socket portion 60 of the storage bracket 10. In the shown example, the socket portion 60 is a short tube section that has a circular cross-section. In particular, the socket portion 60 has a circular cross-section interior bore 62. It is to be noted that in the disclosed example, the interior bore 62 has a shape and has dimensions that correspond to the shape and dimensions of the end 36 of the lift frame portion 14 such that the lift frame portion fits into the bore without undue tightness or undue excessive space. In one example, a lower or distal end of the socket portion is closed (e.g., via a welded plate, see FIG. 4).

Adjacent to the open end of the socket portion 60, two holes 64 extend through the tube that provides the socket portion. The holes 64 are diametrically opposed to each other and are aligned with each other. The holes 64 are located such that, when the end 36 of the lift frame portion 14 is located in the bore 62, the holes 64 on the socket portion 60 are aligned with the holes 42 in the lift frame portion 14. It is to be appreciated that different constructions of the storage bracket 10 are contemplated. The different construction may take into account a different construction of the inter-engaging portions (e.g., the lift frame mounts and the member) of the snow plow arrangement 16.

Figure 3:
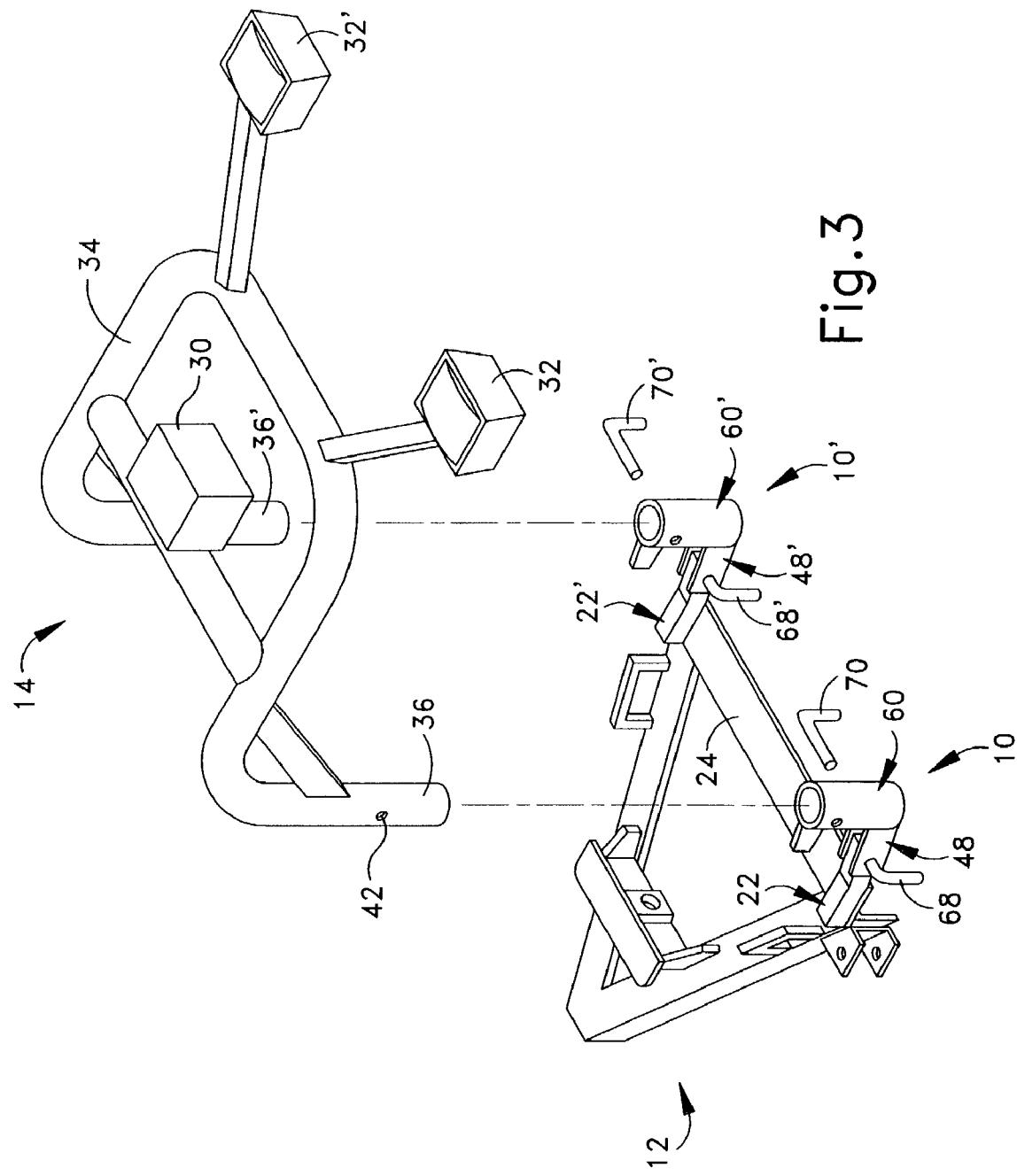
FIG. 3 is a view similar to FIG. 1, but shows the brackets connected to one portion of the snow plow arrangement and the second portion of the snow plow arrangement being placed into the brackets.

Pins, bolts, or the like 68, 70 (schematically shown) are used to secure the storage bracket 10 to the support frame portion 12, and to secure the storage bracket to the lift frame portion 14. Specifically, one pin 68 extends through the hole 56 in the first side plate 52 on the storage bracket 10, through the hole 28 in the lift frame mount 22 of the support frame portion 12, and through the hole 56 in the second side plate 54 on the storage bracket. A second pin 70 extends through the hole 64 in one side of the socket portion 60, extends through the holes 42 in the member 34 of the lift frame portion 14, and through the hole 64 in the other side of the socket portion. The storage bracket 10 can pivot about the first pin 68. The ability to pivot permits the lift frame portion 14 to be engaged with the storage bracket 10 in one orientation (FIG. 3) and then pivoted to another orientation (FIG. 4) after securing with the second pin 70.

It is to be appreciated that the pins 68, 70 that are utilized may include the securing pins, bolts, etc. that are provided with the snow plow arrangement 16. It is contemplated that differ means of securing the storage bracket is contemplated. The different securing means may take into account a different construction of the inter-engaging portions (e.g., the lift frame mounts 22, 22' and the member 34) of the snow plow arrangement 16.

Figure 4:
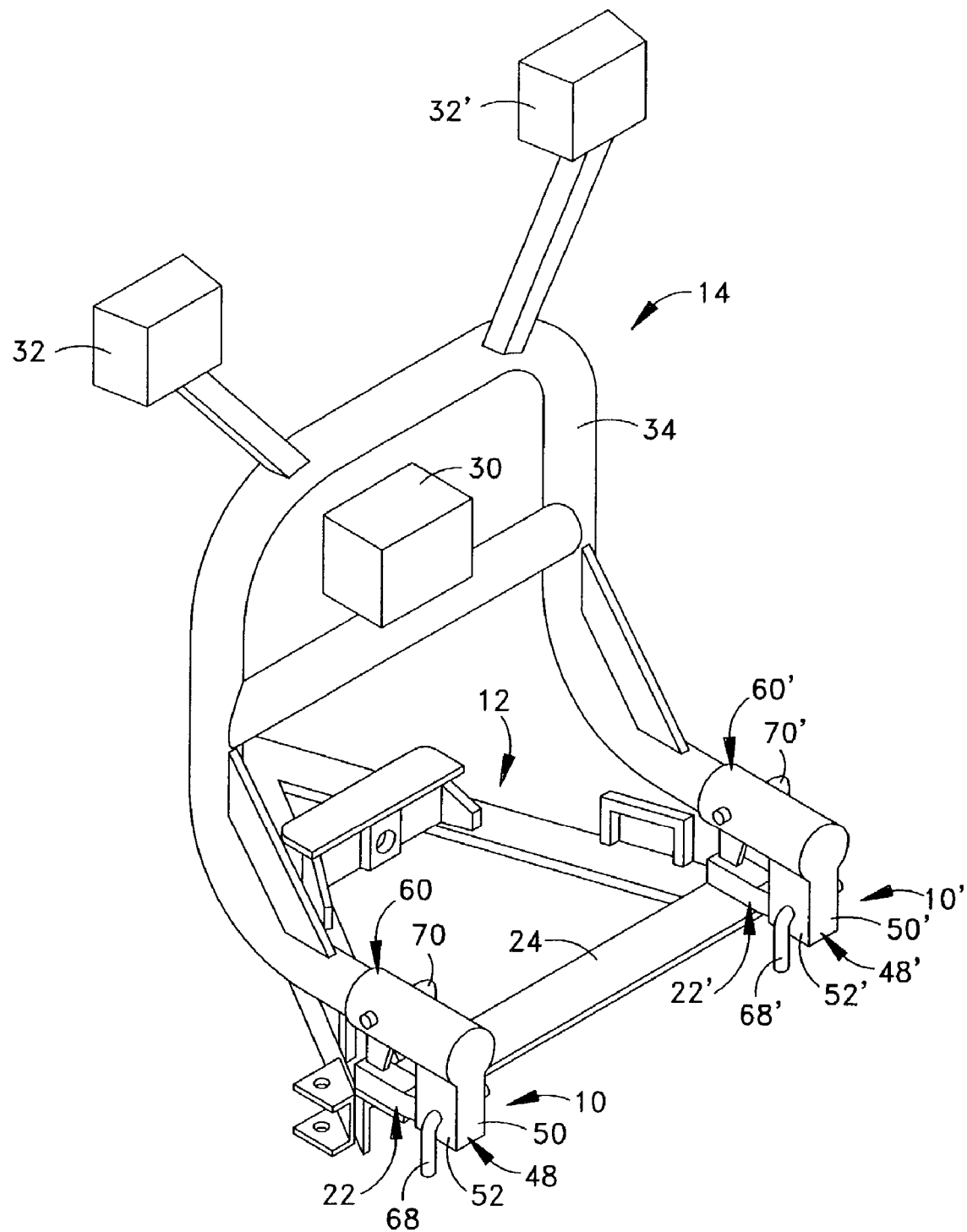
FIG. 4 is a view similar to FIG. 3, but shows the brackets connected to both portions of the snow plow arrangement, and the entire assembly is in a convenient storage orientation.

It is to be appreciated that with the two storage brackets 10, 10' secured to the support frame portion 12 and to the lift frame portion 14, the lift frame portion can be considered to be reversed, left-right, with regard to the orientation of the lift frame portion relative to the support frame portion when the snow plow arrangement 16 is mounted on the vehicle 18. The reversal allows for compact storage of the support frame portion 12 and the lift frame portion 14. Specifically, the bulk of the lift frame portion 14 is located over the bulk of the support frame portion 12, as is shown in FIG. 4. In one respect, the lift frame portion 14 may be considered to be "folded-over" the support frame portion 12.

In the illustrated example, the storage bracket 10 includes a stand-off 76 extending from the socket portion 60. The stand-off 76 extends generally parallel to the extension of the channel portion 48. The purpose of the stand-off 76 is to engage the lift frame mount 22 once the storage bracket 10, and the attached lift frame portion 14 are pivoted to a desired location (e.g., a folded-over location) relative to the support frame portion 12. The engagement of the stand-off 76 with the lift frame mount 22 and the general folded-over position of the lift frame portion 14 are shown in FIG. 4.

The connection of the storage brackets 10, 10' to the support frame portion 12 and the lift frame portion 14, and also the ability to compactly store the support frame portion and the lift frame portion is aided by the pivoting ability of the secured bracket relative to the support frame portion. Specifically, for each storage bracket (e.g., 10), with the pin (e.g., 68) securing the storage bracket to the support frame portion 12, the storage bracket, and the lift frame portion 14, if attached, can pivot relative to the support frame portion about the pin securing the storage bracket to the support frame portion. This pivoting is appreciated upon a comparison of FIGS. 3 and 4.

As such, the present invention provides a means to provide safe and compact storage of the portions of a snow plow arrangement upon removal from a vehicle. Also, the use of the present invention facilitates the use of a snow plow portion moving device (e.g., a wheeled cart) that supports the portions for easy movement.

From the above description of the invention, those skilled in the art will perceive improvements, changes and modifications in the invention. Such improvements, changes and modifications within the skill of the art are intended to be covered by the appended claims.

What is claimed is:

1. A snow plow arrangement and storage bracket combination comprising: a snow plow arrangement having a support frame portion adapted to be mounted on an associated vehicle for supporting another portion of the snow plow arrangement and a lift frame portion mountable on the support frame portion and for lifting another portion of snow plow arrangement, the support frame portion and the lift frame portion having inter-engagement segments that inter-engage when the lift frame is mounted on the support frame segment; and a storage bracket including:

a first segment for engaging the inter-engagement segment of the support frame portion of the snow plow arrangement when the support frame portion is removed from the associated vehicle, the first segment having a generally U-shaped channel portion;

and a second segment for engaging the inter-engagement segment of the lift frame portion of the snow plow arrangement when the lift frame portion is removed from the associated vehicle, wherein the storage bracket retains the lift frame portion relative to the support frame portion, the second segment having an interior bore with a generally circular cross-section;

a first pin extending through first and second holes, the first and second holes provided through a first side plate and a second side plate, respectively, of the first segment; and a second pin extending through third and fourth holes, the third and fourth holes being aligned and diametrically opposed on a tube portion of the second segment, wherein the first and second segment are immovably secured together.

2. The snow plow arrangement and storage bracket combination as set forth in claim 1, wherein one of the first and second segments of the storage bracket includes structure for permitting relative pivoting between the support frame portion and the lift frame portion of the snow plow arrangement when the inter-engagement segments of the support frame portion and the lift frame portion are engaged with the storage bracket.

3. The snow plow arrangement and storage bracket combination as set forth in claim 1, further comprising a stand-off member, extending from the second segment, for engaging a segment of the support frame portion when the storage bracket and lift frame portion are pivoted to a desired position relative to the support frame portion and supporting the storage bracket and lift frame portion at the position.

4. The snow plow arrangement and storage bracket combination as set forth in claim 3, wherein the stand-off member extends generally parallel to the first segment.

5. The snow plow arrangement and storage bracket combination as set forth in claim 1, wherein the U-shaped channel portion of the first segment of the storage bracket is sized and configured to receive a portion of the inter-engagement segment of the support frame therein, and the second segment of the storage bracket is sized and configured to receive a portion of the inter-engagement segment of the lift frame portion within the interior bore.

6. The snow plow arrangement and storage bracket combination as set forth in claim 5, wherein the U-shaped channel portion of the first segment is open in the same direction as the interior bore of the second segment is open.

7. The snow plow arrangement and storage bracket combination as set forth in claim 6, wherein the U-shaped channel portion of the first segment is directly connected to the second segment at one end of the U-shaped channel portion, and the U-shaped channel portion is open along its entire extent from the end connected to the second segment to a distal end of the U-shaped channel portion.

8. The snow plow arrangement and storage bracket combination as set forth in claim 5, wherein the U-shaped channel portion of the first segment includes two flat sides defined by the first and second side plates and a flat interconnection between the flats sides to provide the U-shape, and the flat sides and flat interconnection being sized and configured to receive a rectangular portion of the inter-engagement segment of the support frame.

9. The snow plow arrangement and storage bracket combination as set forth in claim 1, wherein the first pin is a pivot for the storage bracket and the lift frame portion relative to the support frame portion, and the second pin is a retainer for keeping the lift frame portion within the tube portion of the second segment.

* * * * *